United States Patent
Ovesjö et al.

(10) Patent No.: US 10,660,051 B2
(45) Date of Patent: May 19, 2020

(54) HOLISTIC SLOT POSITION-TPC COMMAND COMBINING PERIOD FOR REDUCED TPC FREQUENCY OPERATION

(71) Applicant: Telefonaktiebolaget LM Ericsson (publ), Stockholm (SE)

(72) Inventors: Fredrik Ovesjö, Älvsjö (SE); Erik Larsson, Uppsala (SE); Gerardo Medina Acosta, Märsta (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/759,461

(22) PCT Filed: Oct. 19, 2016

(86) PCT No.: PCT/SE2016/051016
§ 371 (c)(1),
(2) Date: Mar. 12, 2018

(87) PCT Pub. No.: WO2017/069690
PCT Pub. Date: Apr. 27, 2017

(65) Prior Publication Data
US 2018/0263003 A1    Sep. 13, 2018

Related U.S. Application Data

(60) Provisional application No. 62/243,520, filed on Oct. 19, 2015.

(51) Int. Cl.
*H04W 52/58*    (2009.01)
*H04W 52/54*    (2009.01)

(52) U.S. Cl.
CPC ........... *H04W 52/58* (2013.01); *H04W 52/54* (2013.01)

(58) Field of Classification Search
CPC .............................. H04W 52/58; H04W 52/54
USPC ....... 455/522, 69, 452.1, 455, 458, 509, 516
See application file for complete search history.

(56) References Cited

U.S. PATENT DOCUMENTS

| 2008/0049655 | A1  | 2/2008 | Lundby et al. |  |
|---|---|---|---|---|
| 2012/0082192 | A1* | 4/2012 | Pelletier | H04B 7/0404 375/219 |
| 2013/0142174 | A1* | 6/2013 | Larsson | H04B 7/0434 370/335 |

(Continued)

FOREIGN PATENT DOCUMENTS

JP    2012500586 A    1/2012

OTHER PUBLICATIONS

International Search Report and Written Opinion dated Jan. 16, 2017 for International Application No. PCT/SE2016/051016 filed Oct. 19, 2016, consisting of 12-pages.

(Continued)

*Primary Examiner* — John J Lee
(74) *Attorney, Agent, or Firm* — Christopher & Weisberg, P.A.

(57) ABSTRACT

A method and system for mapping a transmit power control, TPC, command in a time slot of a radio frame to be transmitted to at least one wireless device on a downlink are provided. According to one aspect, a method includes transmitting a TPC command in one of a first and second slot within a slot cycle of the radio frame, the TPC symbol position used being for performing the mapping of the TPC command based on a configured slot format.

21 Claims, 8 Drawing Sheets

(56) References Cited

U.S. PATENT DOCUMENTS

2016/0249298 A1* 8/2016 Larsson .............. H04W 52/146
2017/0086147 A1* 3/2017 Zhang ................ H04W 52/245

OTHER PUBLICATIONS

International Preliminary Report on Patentability dated Oct. 16, 2017 for International Application No. PCT/SE2016/051016 filed Oct. 19, 2016, consisting of 18-pages.
3GPP TR 25.706 V2.0.0; Title: "3rd Generation Partnership Project; Technical Specification Group Radio Access Network; Downlink enhancements for UMTS"; (Release 13); Jun. 2015, consisting of 57-pages.
3GPP TS 25.211 V12.1.0; Title: 3rd Generation Partnership Project; Technical Specification Group Radio Access Network; Physical channels and mapping of transport channels onto physical channels (FDD); (Release 12); Dec. 2014, consisting of 67-pages.
3GPP TS 25.214 V12.3.0; Title: 3rd Generation Partnership Project; Technical Specification Group Radio Access Network; Physical layer procedures (FDD); (Release 12); Jun. 2015, consisting of 137-pages.
3GPP TSG RAN WG1 Meeting #81 R1-154801; Title: "Chairpersons' summary of the UMTS sessions"; Source: UMTS Session Chairpersons (Carmela Cozzo, Huawei, Gerardo Agni Medina Acosta, Ericsson); Agenda Item: 6—UTRA; Location and Date: Beijing, China, Aug. 24-28, 2015, consisting of 4-pages.
3GPP TSG RAN Meeting #65 RP-141657; Title: New SID: Study on Downlink Enhancements for UMTS; Source: Huawei, HiSilicon; Document for: Approval; Agenda Item: 14.1.2; Location and Date: Edinburgh, Scotland, Sep. 3-12, 2014, consisting of 6-pages.
3GPP TSG-RAN WG1 Meeting #82 R1-154685; Title: "L1 aspects on the potential new Rel-13 power control algorithm for processing DL TPC commands"; Source: Ericsson; Agenda Item: 6.3.1; Document for: Discussion; Location and Date: Beijing, P.R. China, Aug. 24-28, 2015, consisting of 6-pages.
3GPP TSG RAN WG1 Meeting #82bis R1-155985; Title: "Further considerations on UE behaviour for Algorithm 3"; Source: Huawei, HiSilicon; Agenda Item: 6.2.1; Document for: Discussion/Decision; Location and Date: Malmo, Sweden, Oct. 5-9, 2015, consisting of 4-pages.
Japanese Office Action and English Translation dated Apr. 15, 2019 for Application No. 2018-506311, consisting of 4-pages.
3GPP TSG WG1 Meeting #82bis R1-155978; Title: A view on which slot position to transmit the TPC symbol, and the compatibility of CPC with the Algorithm 3; Agenda Item: 6.2.1; Source: Ericsson ; Document for: Discussion; Location and Date: Malmo, Sweden, Oct. 5-9, 2015, consisting of 6-pages.
Extended European Search Report dated Apr. 25, 2019 for European Application No. EP 16857887, consisting of 10-pages.
3GPP TSG-RAN WG4 Meeting #76bis R4-155972; Title: Initial impact analysis of TPC enhancement; Agenda Item: 7.51.2; Source: Ericsson; Document for: Discussion; Location and Date: Sophia Antipolis, France, Oct. 12-16, 2015, consisting of 3-pages.
3GPP TSG RAN WG1 Meeting #82bis R1-155986; Title: Remaining aspects of Algorithm 3 design; Agenda Item: 6.2.1; Source: Huawei, HiSilicon; Document for: Discussion/Decision; Location and Date: Malmö, Sweden, Oct. 5-9, 2015; consisting of 3-pages.
3GPP TSG RAN WG1 Meeting #82bis R1-155047; Title: Final Repoli of 3GPP TSG RAN WG1 #82 v1.1.0 (Beijing, China, Aug. 24-28, 2015); Source: MCC Support; Document for: Approval; Location and Date: Malmö, Sweden, Oct. 5-9, 2015; consisting of 108-pages.
Australian Examination Report No. 2 dated Sep. 18, 2019 for Application No. 2016343238, consisting of 4-pages.

\* cited by examiner

HOLISTIC SLOT POSITION-TPC COMMAND COMBINING PERIOD FOR REDUCED TPC FREQUENCY OPERATION

CROSS-REFERENCE TO RELATED APPLICATIONS

This application is a Submission Under 35 U.S.C. § 371 for U.S. National Stage Patent Application of International Application Number: PCT/SE2016/051016, filed Oct. 19, 2016 entitled "HOLISTIC SLOT POSITION-TPC COMMAND COMBINING PERIOD FOR REDUCED TPC FREQUENCY OPERATION," which claims priority to U.S. Provisional Application No. 62/243,520, filed Oct. 19, 2015, entitled "HOLISTIC SLOT POSITION-TPC COMMAND COMBINING PERIOD FOR REDUCED TPC FREQUENCY OPERATION," the entirety of both of which are incorporated herein by reference.

TECHNICAL FIELD

The present invention relates to wireless communication and in particular, to wireless communication system power control.

BACKGROUND

As part of the Third Generation Partnership Project (3GPP) Release 13, a study on downlink enhancements for Universal Mobile Telecommunication System (UMTS) was performed. Within the area of expertise of the Technical Specification Group (TSG) Radio Access Network (RAN) Working Group 1 (WG1), the study item description (SID) included the possibility of introducing a new algorithm for processing downlink (DL) transmit power control (TPC) commands. From the investigations performed during the study item phase, two candidate algorithms for processing DL TPC commands were derived, which were respectively described as "Repetition of TPC commands" and "Discontinuous transmission (DTX) of TPC commands" algorithms.

In the 3GPP meeting RAN1 #82, the "DTX of TPC commands" algorithm was selected by the TSG RAN WG1 as the new power control algorithm (hereafter Algorithm 3) to be standardized in the 3GPP Release-13. As a general description, the existing Universal Mobile Telecommunications System (UMTS) power control algorithms 1 and 2 both follow a 1500 Hz TPC frequency operation in downlink (i.e., the base station transmits a new TPC command in the downlink in every single slot), while the so called "DTX of TPC commands" algorithm slows down the TPC frequency operation in downlink by either a factor of three or five depending on the decimation factor it has configured. In other words, when the Algorithm 3 is configured, only one out of three slots, or only one out of five slots contain a TPC command, while the rest of the slots are decimated (i.e., no transmission is performed).

In RAN1 #82bis, the TSG RAN WG1 continued the discussions on the procedures and/or compatibility issues that until that moment were unclear or required further investigations towards the proper standardization of the power control Algorithm 3 in the Release 13. One of the open technical issues referred to the slot position within a slot-cycle (i.e., a group of slots that is equal to the configured decimated factor) over which the TPC command should be transmitted in the DL.

During the Study Item phase, the operation of the Algorithm 3 was always exemplified by mapping the TPC command to be transmitted in the DL to the first slot within a slot-cycle. In relation to it, during the session held in RAN1 #82 it was questioned whether the Algorithm 3 could use as well (i.e., in a deterministic manner) the last slot within a slot-cycle in order to transmit the DL TPC symbol.

On the other hand, since one of the advantages of the Algorithm 3 is the ability of multiplexing other wireless devices such as user equipments (UEs) in the same TPC symbol while the decimation occurs, during RAN1 #82 it was mentioned that in order to address this advantage of the Algorithm 3, perhaps the DL TPC symbol could be mapped to any slot within the slot-cycle. However, on this point it is noteworthy that the standard already allows (i.e., by assigning suitable combinations of fractional dedicated physical channel (F-DPCH) frame timings and slot formats) multiplexing wireless devices in the same F-DPCH TPC symbol position on the same F-DPCH channelization code. Therefore, it is not really needed to add new signaling for the same purpose (i.e., add signaling to dynamically indicate to the wireless device the slot # within the slot-cycle where the TPC command is supposed to be received).

Nonetheless, during RAN1 #82bis it was pointed out that there is a potential TPC symbol position collision issue in soft handover, if the base stations configured with the Algorithm 3 map in a deterministic manner the TPC command to be transmitted in the DL always in the first slot within a slot-cycle.

The slot position within a slot-cycle over which the TPC command should be transmitted in the DL currently remains as an open issue, which however has to be promptly resolved in order to finalize the standardization of the Algorithm 3 in the Release-13.

Moreover, during the Study Item phase, the F-DPCH was used to exemplify the transmission of the TPC command to be sent in downlink. Background about this physical channel is provided as follows.

The F-DPCH was introduced in Rel-6 in order to reduce the amount of downlink channelization codes used for dedicated channels. Instead of allocating one DPCH for the sole purpose of transmitting one power control command per slot, the F-DPCH allows up to ten wireless devices to share a single channelization code for this purpose. The F-DPCH uses spreading factor 256 and quadrature phase shift keying (QPSK) modulation.

The frame structure of the F-DPCH is straightforward. Each frame of length 10 ms is split into 15 slots, where each slot consists of 2560 chips. Each slot contains 10 symbols where each symbol consists of 2 channel bits. Every symbol corresponds to one TPC command; bit sequence 11 represents TPC command UP and bit sequence 00 represents TPC command DOWN. Consequently, every slot can carry up to 10 TPC commands and hence one F-DPCH can accommodate up to 10 wireless devices.

In the specifications, wireless devices are allocated different TPC command symbols to listen to by assigning the wireless device a certain F-DPCH channelization code and F-DPCH slot format to listen to. The concept is illustrated by FIG. 1 and Table 1 below.

TABLE 1

| Slot Format #i | Channel Bit Rate (kbps) | Channel Symbol Rate (ksps) | SF | Bits/ Slot | $N_{OFF1}$ Bits/ Slot | $N_{TPC}$ Bits/ Slot | $N_{OFF2}$ Bits/ Slot |
|---|---|---|---|---|---|---|---|
| 0 | 3 | 1.5 | 256 | 20 | 2 | 2 | 16 |
| 1 | 3 | 1.5 | 256 | 20 | 4 | 2 | 14 |
| 2 | 3 | 1.5 | 256 | 20 | 6 | 2 | 12 |
| 3 | 3 | 1.5 | 256 | 20 | 8 | 2 | 10 |

TABLE 1-continued

| Slot Format #i | Channel Bit Rate (kbps) | Channel Symbol Rate (ksps) | SF | Bits/ Slot | $N_{OFF1}$ Bits/ Slot | $N_{TPC}$ Bits/ Slot | $N_{OFF2}$ Bits/ Slot |
|---|---|---|---|---|---|---|---|
| 4 | 3 | 1.5 | 256 | 20 | 10 | 2 | 8 |
| 5 | 3 | 1.5 | 256 | 20 | 12 | 2 | 6 |
| 6 | 3 | 1.5 | 256 | 20 | 14 | 2 | 4 |
| 7 | 3 | 1.5 | 256 | 20 | 16 | 2 | 2 |
| 8 | 3 | 1.5 | 256 | 20 | 18 | 2 | 0 |
| 9 | 3 | 1.5 | 256 | 20 | 0 | 2 | 18 |

The F-DPCH can be configured with ten different slot formats (from 0 to 9, i.e. #0, #1, #2, #3, #4, #5, #6, #7, #8, and #9), being the difference between the location of the TPC symbol position within a slot.

When the "DTX of TPC commands" algorithm is in use, only one TPC command is transmitted in the downlink per slot cycle (i.e., one out of three slots, or one out of five slots depending on the decimation factor).

When a wireless device is in soft handover (SHO), multiple TPC commands may be received in each slot from different cells in the active set. Assuming the slot format #9 of the F-DPCH is configured to be used with the Algorithm 3, if in SHO the base stations map the TPC command to be transmitted in the DL to any of the first two TPC symbol positions of the first slot within a slot-cycle, and any of the radio links other than the one that was configured first has the first 512 chips of the non-decimated slot unavailable, then the TPC command of those radio links would have to be mapped to another TPC symbol position within the first slot. Nonetheless, receiving TPC symbols from different radio links more than 512 chips apart from the starting boundary of the non-decimated slot would make it impossible for wireless device to combine the TPC commands received from different radio links in the DL when the F-DPCH is configured because there is a delay of 512 chips before the wireless device is able to start the so called "TPC command combining period." The issue is illustrated in FIG. 2. The same problem exists when the F-DPCH slot format #0 is used.

SUMMARY

Some embodiments advantageously provide a method and system for mapping a transmit power control, TPC, command in a time slot of a radio frame to be transmitted to at least one wireless device on a downlink. According to one aspect, the method includes transmitting a TPC command in one of a first and second slot within a slot cycle of the radio frame, the slot used being based on a configured slot format. The method further comprises mapping a TPC command to one of a first and a second slot of the radio frame. The TPC symbol position used for performing the mapping of the TPC command is based on a configured slot format. The method further comprises a TPC combining period receiving TPC commands from different radio links based on whether the TPC command is mapped to the first slot or the second slot within a slot cycle.

According to this aspect, in some embodiments, the slot used is a fractional dedicated physical channel (F-DPCH) slot and the configured slot formats are one of slot formats #0, #1, #2, #3, #4, #5, #6, #7, #8 and #9, and wherein the TPC command is transmitted within the second F-DPCH slot of a slot cycle if the configured slot format is #0 or #9, and otherwise within the first F-DPCH slot of a slot cycle. In some embodiments, the method further includes transmitting a TPC command in one of a first and second slot of a slot cycle within the length of a TPC command combining period which duration is one slot starting two TPC symbol positions after the downlink slot boundary of a fractional dedicated physical channel F-DPCH. In some embodiments, each slot cycle is composed of a group of adjacent slots within the set of slots composing a radio frame of the fractional dedicated physical channel, F-DPCH, in a universal mobile telecommunication system, UMTS, wireless network. In some embodiments, a TPC command is transmitted in one slot of a slot cycle that encompasses one of 3 and 5 slots, with 10 TPC symbols per slot, and each TPC command occupying one TPC symbol. In some embodiments, the F-DPCH slot format to be used for mapping a TPC command in the first slot within a slot cycle specifies an offset from a boundary of the first slot by one of 2, 3, 4, 5, 6, 7, 8 and 9 TPC symbols, and the F-DPCH slot format to be used for mapping a TPC command in the second slot within a slot cycle specifies that a TPC command is transmitted adjacent to a start of a boundary of the second slot in any of the first two TPC symbol positions of that slot. In some embodiments, one of the following steps is performed: a first two TPC symbol positions of the second slot within a slot cycle are used for transmission of a TPC command to a wireless device; and subsequent TPC symbol positions within the first slot of the slot cycle are specified by the F-DPCH slot format #1 to #8. In some embodiments, when the TPC command is transmitted in the first slot or second slot of a slot cycle, the TPC combining period is started after two TPC symbol positions have passed with respect to the downlink slot boundary of the F-DPCH radio frame. In some embodiments, the method further includes starting the TPC combining period after the first two TPC symbols of the first slot of a F-DPCH radio frame occur and ending the TPC combining period after the first two TPC symbols of a next subsequent slot occur, the TPC combining periods repeating in succession. In some embodiments, a start of the TPC combining period is determined relative to a start of a primary common control physical channel, P-CCPCH, In some embodiments, the start of the TPC combining period relative to a start of a primary common control physical channel, P-CCPCH, is given by:

TPC_TX_offset=(tF-DPCH+2560*$k$*$N$+start_offset+ 256*$N$OFF1/2)modulo 38400 for k=0, 1, . . . , 15/N−1, where start_offset=2560 if NOFF1=0, otherwise start_offset=0, tF-DPCH is the fractional dedicated physical channel, F-DPCH, frame timing offset relative to the P-CCPCH, and NOFF1 can be found in an F-DPCH slot format table for a used slot format.

According to another aspect, a method of mapping a transmit power control, TPC, command in a time slot of a radio frame to be transmitted to at least one wireless device on a downlink is provided. The method includes in an initial radio link configuration, within each slot cycle of a plurality of slot cycles, performing one of: mapping a TPC command to a first slot of the slot cycle having a F-DPCH slot format (#1 to #8) that maps the TPC command to any of the last eight TPC symbol position; and mapping a TPC command to a second slot of the slot cycle having a F-DPCH slot format (#0 or #9) that maps the TPC command to any of the first two TPC symbol positions of the second slot within a slot cycle. In some embodiments, within each slot cycle, one TPC command is transmitted in one of: (a) the first F-DPCH slot with one of the slot formats from #1 to #8 and (b) in the second F-DPCH slot with one of the slot formats #9 and #0.

According to another aspect, a network node for mapping a transmit power control, TPC, command in a time slot of a radio frame to be transmitted to at least one wireless device on a downlink is provided. The network node includes processing circuitry including a processor and a memory in communication with the processor.

The memory is configured to store a TPC command and executable program code which, when executed by the processor, causes the processor to map the TPC command to one of a first and a second slot within a slot cycle of the radio frame based on a configured slot format. The processor is also configured to transmit the TPC command 18 to at least one wireless device (40) in one of a first and second slot within a slot cycle of the radio frame.

According to this aspect, in some embodiments mapping a TPC command (18) to one of a first and second slot within a slot cycle of a radio frame comprises mapping a TPC command to a TPC symbol position of the used slot, wherein the TPC symbol position of the slot used for performing the mapping and transmitting of the TPC command (18) is based on a configured slot format. In some embodiments, the time slot is a fractional dedicated physical channel (F-DPCH) slot and the configured slot formats are one of slot formats #0, #1, #2, #3, #4, #5, #6, #7, #8 and #9, and wherein the TPC command is transmitted within the second F-DPCH slot if the configured slot format is #0 or #9, and otherwise within the first F-DPCH slot. In some embodiments, the processor is further configured for transmitting a TPC command in one of a first and second slot of a slot cycle within the length of a TPC command combining period which duration is one slot starting two TPC symbol positions after the downlink slot boundary of a fractional dedicated physical channel F-DPCH. In some embodiments, each slot cycle is part of the slots composing a radio frame of a fractional dedicated physical channel, F-DPCH, in a universal mobile telecommunication system, UMTS, wireless network.

In some embodiments, a slot cycle encompasses one of 3 and 5 slots, with 10 symbols per slot and each TPC command occupies one TPC symbol. In some embodiments, the F-DPCH slot format to be used for mapping a TPC command in the first slot within a slot cycle specifies an offset from a boundary of the first slot by one of 2, 3, 4, 5, 6, 7, 8 and 9 TPC symbols, and the F-DPCH slot format to be used for mapping a TPC command in the second slot within a slot cycle specifies that a TPC command is transmitted adjacent to a start of a boundary of the second slot in any of the first two TPC symbol positions of that slot. In some embodiments, the F-DPCH slot format to be used for mapping a TPC command in the first slot within a slot cycle is one of slot formats 1-8 of a group of slot formats ranging from 0 to 9, and the F-DPCH slot format to be used for mapping a TPC command in the second slot within a slot cycle is one of slots 0 and 9 of the group of slot formats, the formats of the group being specified by a wireless communication standard. In some embodiments, one the network node performs one of the following: a first two TPC symbol positions of the second slot within a slot cycle are used for transmission of a TPC command to a wireless device; and subsequent TPC symbol positions within the first slot of the slot cycle are specified by the F-DPCH slot format #1 to #8. In some embodiments, the processor is further configured for transmitting a TPC command in one of the first and second slot of a slot cycle within the length of a TPC command combining period which duration is one slot starting two TPC symbol positions after the downlink slot boundary of the F-DPCH. In some embodiments, the processor is further configured to start the TPC combining period after the first two TPC symbols of the first slot of a F-DPCH radio frame occur and end the TPC combining period after the first two TPC symbols of a next subsequent slot occur, the TPC combining periods repeating in succession. In some embodiments, a start of the TPC combining period is determined relative to a start of a primary common control physical channel, P-CCPCH. In some embodiments, the start of the TPC combining period relative to a start of a primary common control physical channel, P-CCPCH, is given by:

$$TPC\_TX\_offset = (tF\text{-}DPCH + 2560 * k * N + start\_offset + 256 * NOFF1/2) \, modulo \, 38400$$

for k=0, 1, . . . , 15/N−1, where start_offset=2560 if NOFF1=0, otherwise start_offset=0, tF-DPCH is the fractional dedicated physical channel, F-DPCH, frame timing offset relative to the P-CCPCH, and NOFF1 can be found in an F-DPCH slot format table for a used slot format.

According to yet another aspect, a network node is configured to map a transmit power control, TPC, command in a time slot of a radio frame to be transmitted to at least one wireless device on a downlink. The network node includes processing circuitry including a processor and a memory in communication with the processor. The memory is configured to store a TPC command. The processor is configured in an initial radio link configuration, to, within each slot cycle of a plurality of slot cycles, perform one of: mapping a TPC command to one of a first slot of the slot cycle having a F-DPCH slot format (#1 to #8) mapping the TPC command to any of a last eight TPC symbol positions of the first slot; and mapping a TPC command to one of second slot of the slot cycle having a F-DPCH slot format (#0 or #9) mapping the TPC command to any of the first two TPC symbol positions of the second slot.

According to yet another aspect, a method of receiving a transmit power control, TPC, command in a slot of a radio frame in a wireless device is provided. The method includes receiving a TPC command within one of a first and second slot within a slot cycle of the radio frame. According to this aspect, in some embodiments, the TPC symbol position used for performing the mapping of the TPC command is based on a configured slot format. In some embodiments, the time slot is a fractional dedicated physical channel (F-DPCH) slot and the configured slot formats are one of slot formats #0, #1, #2, #3, #4, #5, #6, #7, #8 and #9, and wherein the TPC command is received within the second F-DPCH slot if the configured slot format is #0 or #9, and otherwise within the first F-DPCH slot. In some embodiments, the TPC commands from different radio links are stored in registers accessible by a processor. In some embodiments, the method further includes receiving at least two TPC commands from different radio links during a combining period that partially overlaps the first and second slots of a slot cycle to encompass the TPC commands. In some embodiments, the method further includes combining at least two TPC commands from different radio links during a combining period that partially overlaps the first and second slots of a slot cycle to encompass the TPC commands.

According to another aspect, a wireless device for receiving a transmit power control, TPC, command in a slot of a radio frame. The wireless device includes processing circuitry configured to receive a TPC command within one of a first and second slot within a slot cycle of the radio frame. In some embodiments, the TPC symbol position used for performing the mapping of the TPC command is based on a configured slot format. In some embodiments, the time slot is a fractional dedicated physical channel (F-DPCH) slot and the configured slot formats are one of slot formats #0, #1, #2,

3, #4, #5, #6, #7, #8 and #9, and wherein the TPC command is received within the second F-DPCH slot if the configured slot format is #0 or #9, and otherwise within the first F-DPCH slot. In some embodiments, the processing circuitry is further configured to receive at least two TPC commands from different radio links during a combining period that partially overlaps the first and second slots of a slot cycle to encompass the TPC commands. In some embodiments, the wireless device further performs combining at least two TPC commands from different radio links during a combining period that partially overlaps the first and second slots of a slot cycle to encompass at least two TPC commands. In some embodiments, at least two TPC commands from different radio links are stored in registers accessible by a processor.

According to another aspect, a network node for mapping a transmit power control, TPC, command in a time slot of a F-DPCH radio frame to be transmitted to at least one wireless device on a downlink is provided. The network node includes a mapping module configured to map the TPC command to one of a first and a second slot within a slot cycle of the F-DPCH radio frame, wherein the TPC symbol position used for performing the mapping of the TPC command is based on a configured F-DPCH slot format.

According to yet another aspect, a network node mapping of a transmit power control, TPC, command in a time slot of a F-DPCH radio frame to be transmitted to at least one wireless device on a downlink is provided. The network node includes a memory module configured to store a TPC command. The network node also includes an TPC command mapping module configured to map TPC commands to a slot of a slot cycle, the mapping including: mapping a TPC command to a first slot of the slot cycle having a F-DPCH slot format (#1 to #8) mapping the TPC command to any of the last eight TPC symbol position; or mapping a TPC command to a second slot of the slot cycle having a F-DPCH slot format (#0 or #9) mapping the TPC command to any of the first two TPC symbol position within the second slot.

According to this aspect, in some embodiments, each slot cycle is a fractional dedicated physical channel, F-DPCH, in a universal mobile telecommunications system, UMTS, wireless network. In some embodiments, the F-DPCH slot format to be used for mapping a TPC command in the first slot within a slot cycle specifies an offset from a boundary of the first slot within a slot cycle by one of 2, 3, 4, 5, 6, 7, 8 and 9 TPC symbols, and the F-DPCH slot format to be used for mapping a TPC command in the second slot within a slot cycle specifies that a TPC command is transmitted adjacent to a start of a boundary of the second slot in any of the first two TPC symbol positions of that slot. In some embodiments, the F-DPCH slot format to be used for mapping a TPC command in the first slot within a slot cycle is one of slot formats 1-8 of a group of slot formats ranging from 0 to 9, and the F-DPCH slot format to be used for mapping a TPC command in the second slot within a slot cycle is one of slot formats 0 and 9 of the group of slot formats, the formats of the group being specified by a wireless communication standard. In some embodiments, the network node further includes a TPC combining period determiner module configured to start a TPC combining period relative to a start of a primary common control physical channel, P-CCPCH.

According to another aspect, a wireless device for receiving a transmit power control, TPC, command in a slot of a radio frame is provided. The wireless device includes a TPC receiver module configured to receive a TPC command within one of a first and second slot within a slot cycle of the radio frame, wherein the TPC symbol position used for performing the mapping of the TPC command is based on a configured slot format.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
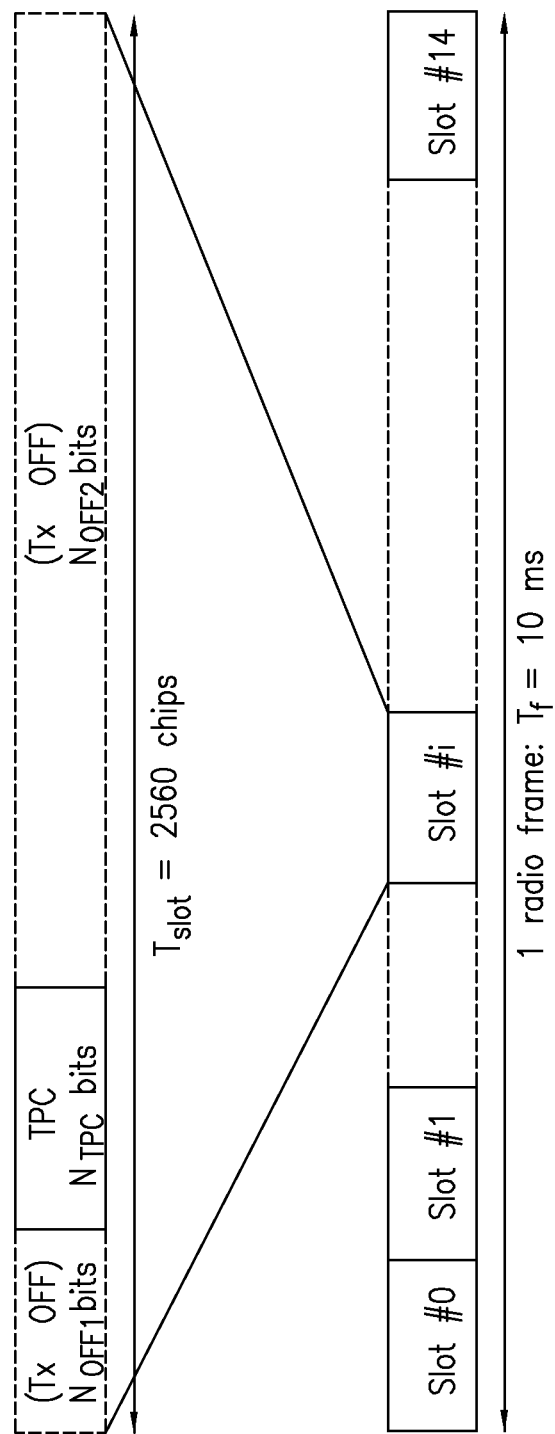
FIG. 1 is a known timing diagram of a radio frame.
Figure 2:
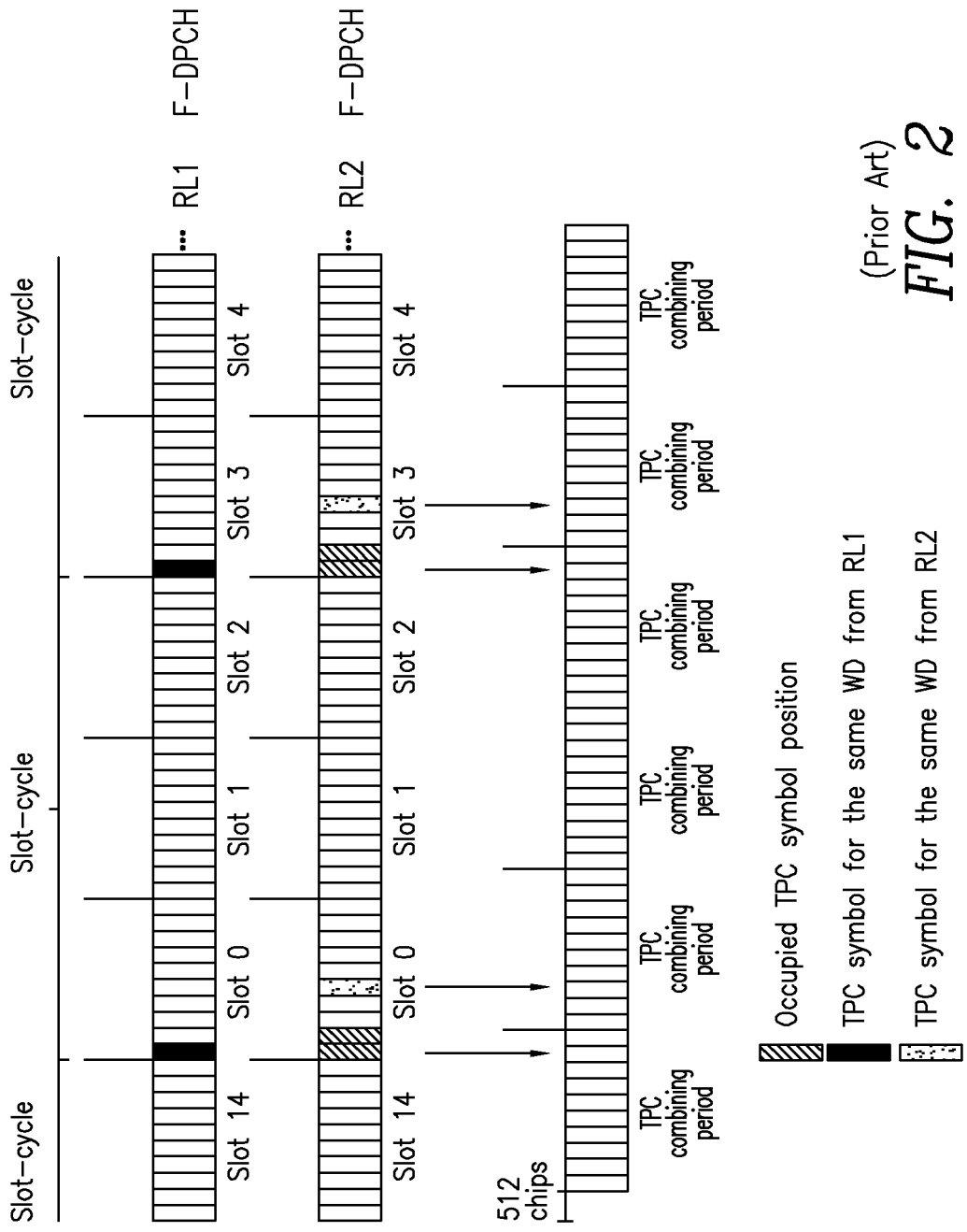
FIG. 2 is a known timing diagram of radio links with TPC commands and TPC combining periods.

Before describing in detail exemplary embodiments, it is noted that the embodiments reside primarily in combinations of apparatus components and processing steps related to downlink transmit power control such as mapping a transmit power control (TPC) command in a time slot of a radio frame to be transmitted to at least one wireless device on a downlink. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

The term "wireless device", as used herein may include (but is not limited to), for example, user equipment (UE), including devices used for machine type communication, machine to machine communication, sensors, USB, wireless embedded devices, laptop mounted devices, tablet computers, etc.

Although terminology from Third Generation Partnership Project (3GPP) Long Term Evolution (LTE) communication systems is used in this disclosure to describe some embodiments, this should not be seen as limiting the scope of the embodiments to only the aforementioned system. Other wireless systems, including not only wideband code division multiple access (WCDMA), WiMax, ultra mobile broadband (UMB) and global system for mobile communications (GSM), but also, other current or future 4G or 5G networks and beyond, may also benefit from exploiting the subject matter covered within this disclosure.

Some embodiments described herein include starting the TPC command combining period in the downlink slot boundary of the F-DPCH, and 512 chips after the downlink slot boundary for F-DPCH. Yet another solution that would avoid introducing new signaling, includes predetermining that whenever the first two TPC symbols are to be used for transmitting TPC commands in downlink, the transmission of the TPC commands will occur in the second slot within the slot-cycle.

Some advantages to some embodiments include:
new signaling is not required in order to indicate to the wireless device which slot within the slot cycle the TPC symbol will be transmitted;
performing a reconfiguration of the former radio link (RL) (i.e., RL1) in order to cause the TPC symbols to fall into the same TPC combining period is not required;
performing a re-configuration of the existing RLs every time a new RL is added is not required; and
a major standardization effort (i.e., dynamic signaling, dynamic re-configuration) for addressing a problem that only may occur in SHO for the F-DPCH slot format 9 is not required.

Figure 3:
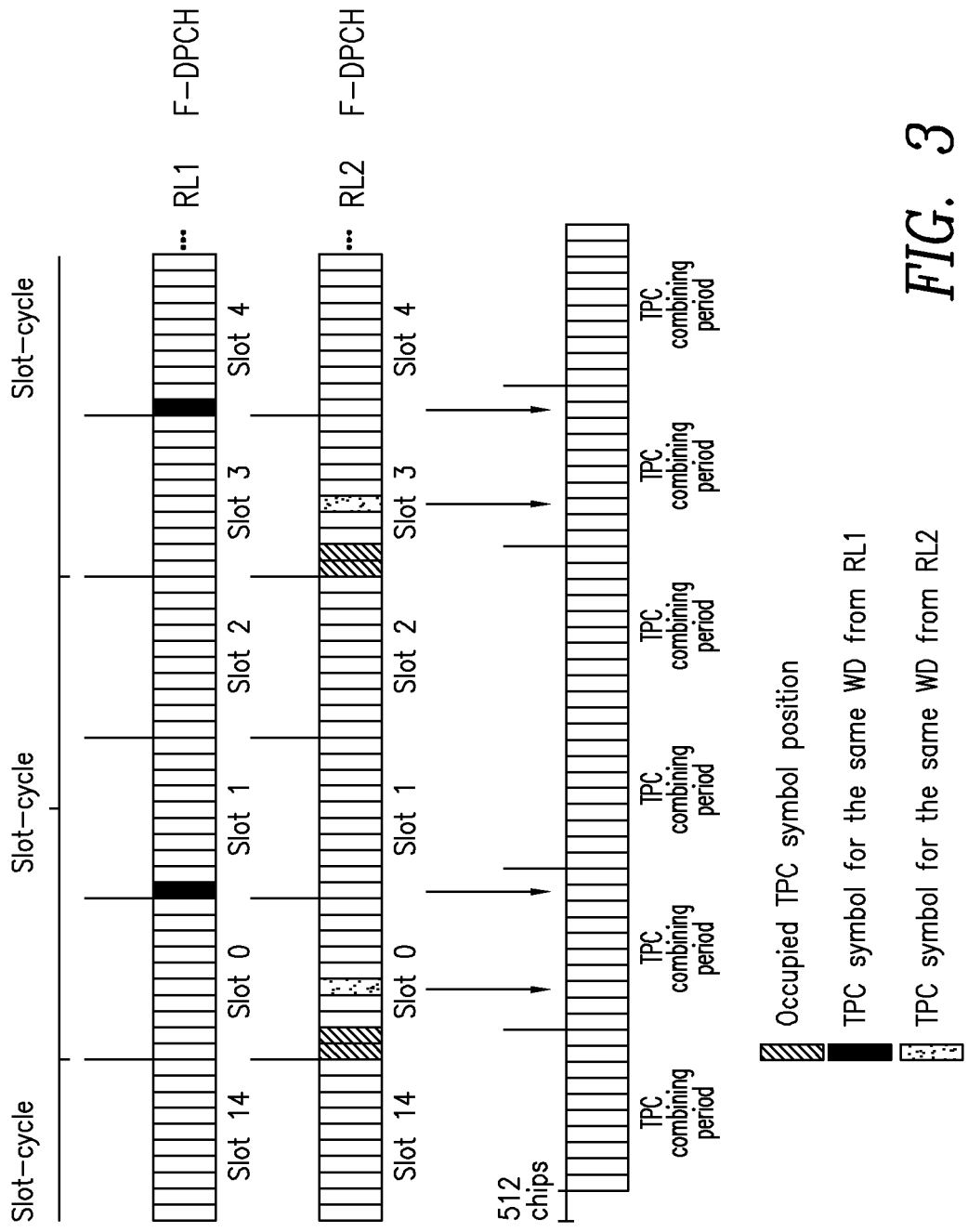
FIG. 3 is a timing diagram showing an example solution to a TPC command mapping problem.

When the new TPC algorithm with reduced TPC frequency (i.e., Algorithm 3) is applied, the slot position within a slot-cycle over which the TPC command is going to be transmitted in the DL following either of the arrangements described below:
Deterministic Slot Position: Mapping the TPC command to be transmitted in the DL in a deterministic manner always to the first slot within a slot-cycle by starting the TPC command combining period at the downlink slot boundary of the F-DPCH. The TPC command combining period has a length of one slot, beginning at the downlink slot boundary for DPCH, and for F-DPCH when the Algorithm 3 is configured, and 512 chips after the downlink slot boundary for F-DPCH when the Algorithm 3 is not configured.
Deterministic Rule Based Slot Position: Mapping the TPC command to be transmitted in the DL in a deterministic manner to a second slot within a slot-cycle when slot format #9 or #0 of the F-DPCH is configured and the TPC command to be transmitted in the DL is mapped to any of the first two TPC symbol positions of this slot. Otherwise, when the other slot formats #1-#8 is used, the TPC command to be transmitted in the DL shall be mapped in a deterministic manner always to the first slot within a slot-cycle. The network node maps and transmits the TPC command, to the wireless device, in one of a first and second slot, and the wireless device then receives the TPC command in said slot. In other words, the second slot should be used for slot formats 0 and 9, and the first slot should be used for all other slot formats, i.e., slots 1-8. Slot formats #9 and #0 refer to the first two TPC symbol positions within a slot and these will thus be used within the second slot, whereas all other slot formats (#1-#8) are available within the first slot, meaning that the TPC command may be mapped to any of the last eight TPC symbol positions. This solution addressing the SHO scenario when slot format #9 or #0 of the F-DPCH is configured to be used with the Algorithm 3 and includes predetermining that whenever the first two TPC symbols within a slot are to be used for transmitting TPC commands in downlink, the transmission of the TPC commands shall occur in the second slot within the slot-cycle. This solution is depicted in FIG. 3 for the example where slot format #9 is used on RL1. Thus, in the initial radio link configuration, within each slot cycle, the UE receives one TPC command in the first F-DPCH slot with one of the slot formats from #1 to #8 or in the second F-DPCH slot with one of the slot formats #9 and #0. This solution will for example solve issues related with the reception of TPC commands from different radio links in soft handover scenarios.

As can be observed from FIG. 3, which is a timing diagram showing an example solution to a TPC command mapping problem, the "TPC command combining period issue" is addressed by adopting the deterministic rule based slot position solution depicted above. FIG. 3 can also be illustrated from a mathematical perspective. Assume that the slots in a F-DPCH radio frame are numbered 0, 1, 2, , , , 14. Further assume that a TPC frequency reduction of factor 3 (N=3) is applied. The start point (relative to the P-CCPCH frame, measured in chips) of the transmitted TPC symbols for a wireless device using a reduction factor of N will be:

$$TPC\_TX\_offset=(tF\text{-}DPCH+2560*k*N+start\_offset+256*NOFF1/2) \bmod 38400$$

for k=0, 1, . . . , 15/N−1, where start_offset=2560 if NOFF1=0, otherwise start_offset=0, and tF-DPCH is the F-DPCH frame timing offset relative to the primary Common Control Physical Channel (P-CCPCH), and NOFF1 can be found in the F-DPCH slot format table for the used slot format.

Figure 4:
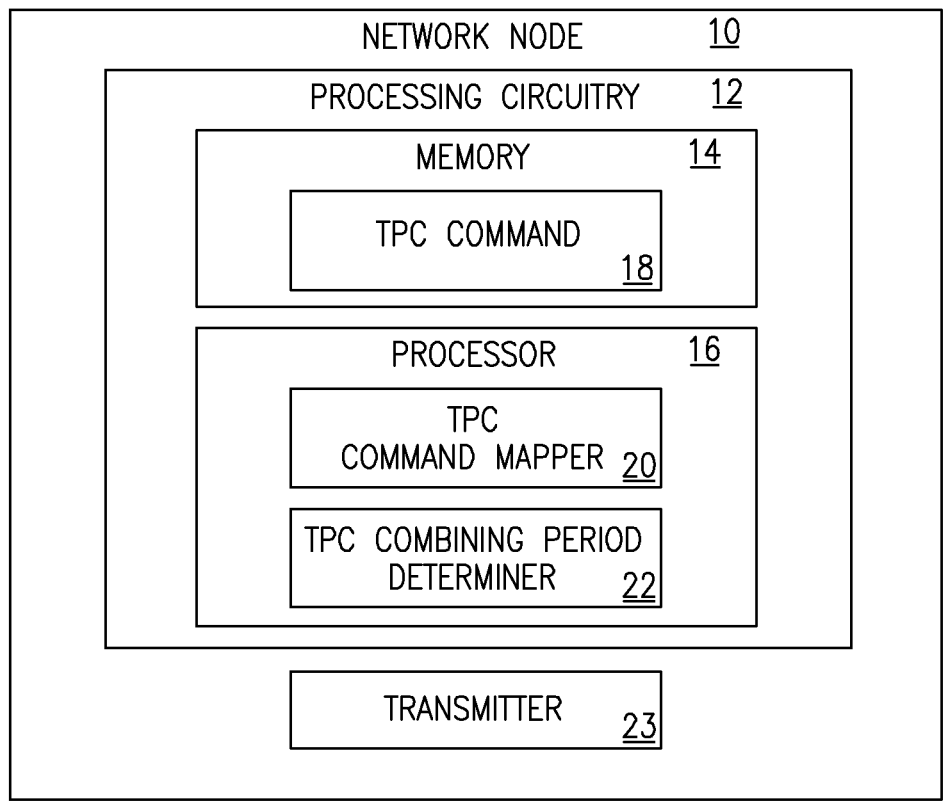
FIG. 4 is a block diagram of a network node constructed in accordance with principles described herein.

FIG. 4 is a block diagram of a network node constructed in accordance with principles described herein. The network node 10 includes processing circuitry 12 which may be implemented by a memory 14 and a processor 16. Processing circuitry 12 may comprise and/or be connected to and/or be configured for accessing (e.g., writing to and/or reading from) memory 14, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 14 may be configured to store code executable by control circuitry and/or other data, e.g., data pertaining to communication, e.g., configuration and/or address data of nodes, etc. Processing circuitry 12 may be configured to control any of the methods described herein and/or to cause such methods to be performed, e.g., by processor 16. Corresponding instructions may be stored in the memory 14, which may be readable and/or readably connected to the processing circuitry 12. In other words, processing circuitry 12 may include a controller, which may comprise a microprocessor and/or microcontroller and/or FPGA (Field-Programmable Gate Array) device and/or ASIC (Application Specific Integrated Circuit) device. It may be considered that processing circuitry 12 includes or may be connected or connectable to memory 14, which may be configured to be accessible for reading and/or writing by the controller and/or processing circuitry 12.

The memory 14 is configured to store a TPC command 18. The processor is configured to implement a TPC command mapper 20 which functions to map the TPC command to one of a first slot within a slot cycle that is part of a plurality of slots composing a radio frame and to a second slot within the slot cycle of the radio frame. The TPC symbol position used for performing the mapping of the TPC command is based on a configured slot format. The processor 16 may also be configured to determine, via a TPC combining period determiner 22, a start of a TPC command combining period. In some embodiments, the TPC command combining period has a length of one slot, beginning at the downlink slot boundary for DPCH, and 512 chips after the downlink slot boundary for F-DPCH. In some embodiments, the TPC command mapper 20 may be configured in an initial radio link configuration to, within each slot cycle of a plurality of slot cycles, perform one of: (a) mapping a TPC command to one of a first slot of the slot cycle having a F-DPCH slot format (#1 to #8) that maps the TPC command to any of a last eight TPC symbol positions of the first slot; and (b) mapping a TPC command to one of second slot of the slot cycle having a F-DPCH slot format (#0 or #9) that maps the TPC command to any of the first two TPC symbol positions of the second slot. In some embodiments, the TPC command mapper 20 is configured to map the TPC command to one of a first and a second slot within a slot cycle of the F-DPCH radio frame, where the TPC symbol position used for performing the mapping of the TPC command is based on a configured F-DPCH slot format. The network node also includes a transmitter 23 configured to transmit TPC commands to a wireless device.

Figure 5:
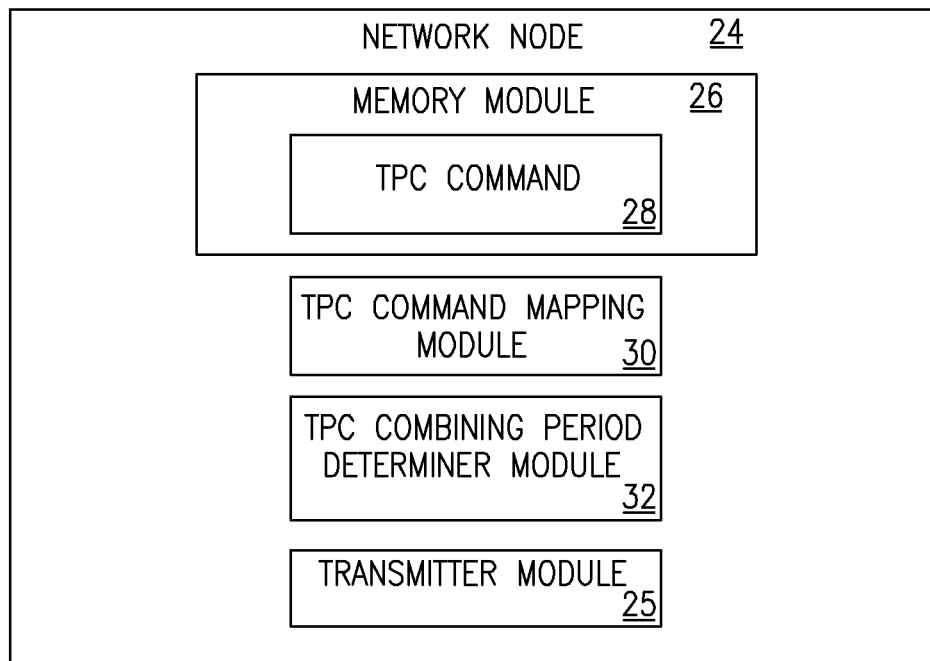
FIG. 5 is a block diagram of an alternative network node constructed in accordance with principles described herein.

FIG. 5 is a block diagram of an alternative network node constructed in accordance with principles described herein. The network node 24 includes a memory module 26 that stores a TPC command 28. A TPC command mapping module 30 may be implemented as software that, when executed by a processor, configures the processor to map the TPC command to one of a first slot within a slot cycle of a radio frame and to a second slot within the slot cycle of the radio frame according to the functions described above with reference to the TPC command mapper 20. TPC combining period determiner module 32 may also be implemented in software to configure the processor to start a TPC combining period. The network node also includes a transmitter module 25 configured to transmit TPC commands to a wireless device.

Figure 6:
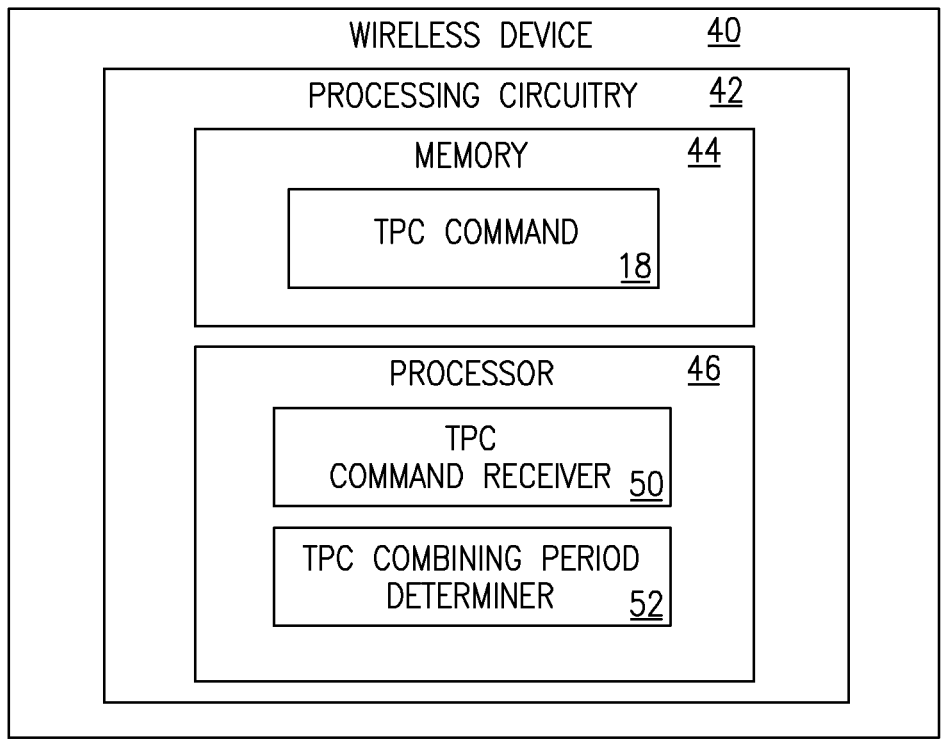
FIG. 6 is a block diagram of an embodiment of a wireless device configured to receive TPC commands from one or more network nodes or other wireless devices during a TPC combining period.

FIG. 6 is a block diagram of an embodiment of a wireless device 40 configured to receive TPC commands from one or more network nodes or other wireless devices during a TPC combining period. The wireless device 40 includes processing circuitry 42 that includes a memory 44 and a processor 46. Processing circuitry 42 may comprise and/or be connected to and/or be configured for accessing (e.g., writing to and/or reading from) memory 44, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store TPC commands 18. The processor 46 is configured to implement a TPC command receiver 50 that receives a TPC command within one of a first slot and a second slot with a slot cycle of a radio frame. In some embodiments, a TPC combining period determiner 52 functions to determine a TPC combining period during which to receive TPC commands during a slot cycle.

Figure 7:
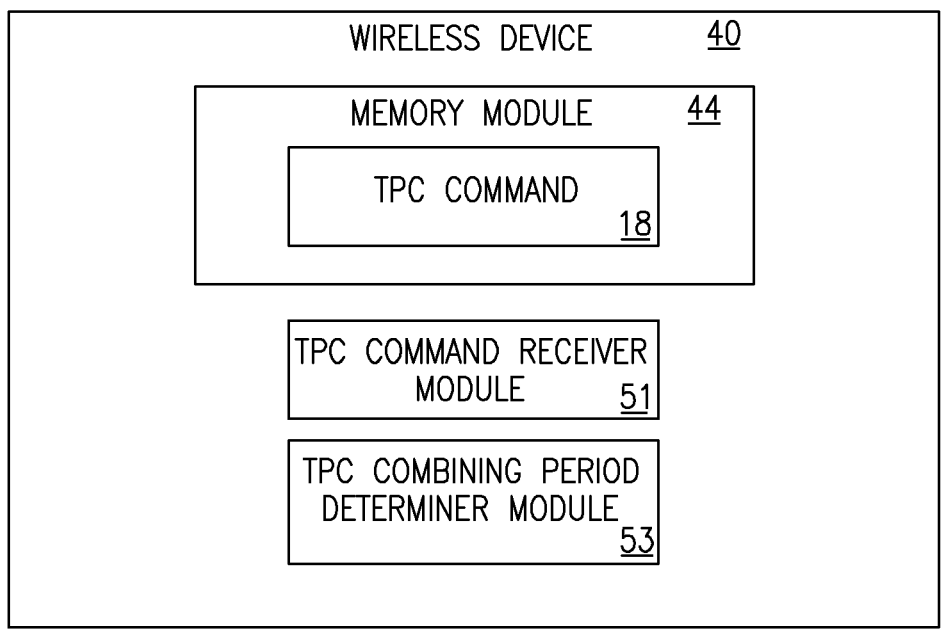
FIG. 7 is a block diagram of an alternative embodiment of a wireless device that has a memory module and software modules and that contain software to instruct a computer processor to receive TPC commands during a TPC combining period.

FIG. 7 is a block diagram of an alternative embodiment of a wireless device 40 that has a memory module 44 and software modules 51 and 53 that contain software to instruct a computer processor to receive TPC commands during a TPC combining period. In particular, the TPC receiver module 51 configures a processor to receive a TPC command within one of a first and second slot within a slot cycle of the radio frame. The TPC combining period determiner module 53 configures a processor to determine a TPC combining period.

Figure 8:
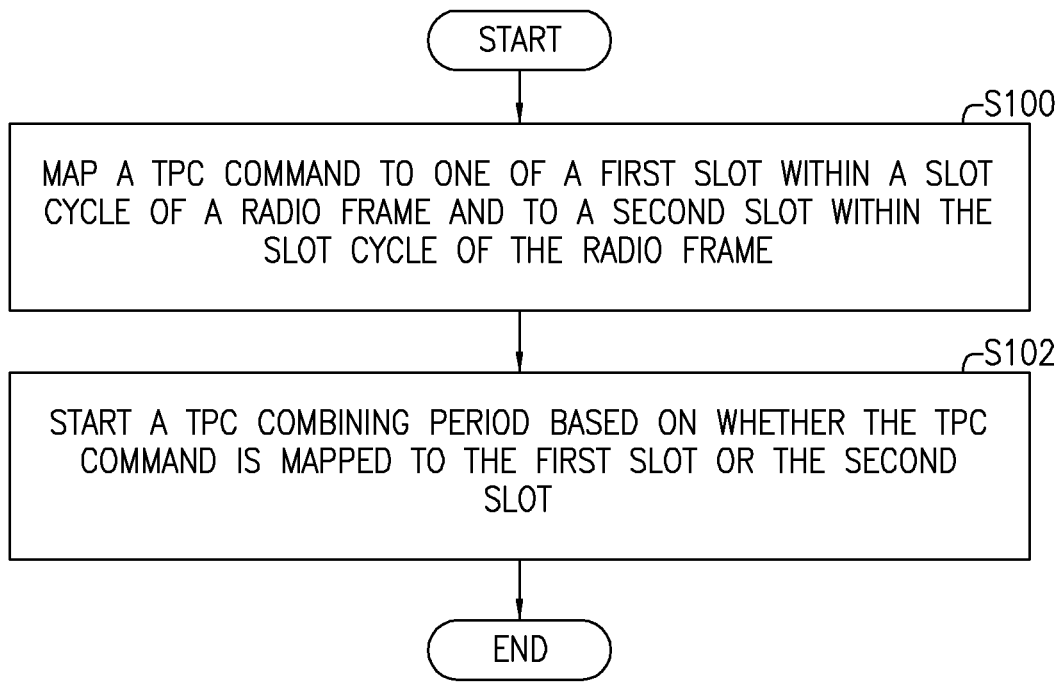
FIG. 8 is a flowchart of an exemplary process for mapping TPC commands and starting TPC combining periods.

FIG. 8 is a flowchart of an exemplary process for mapping TPC commands and starting TPC combining periods. The process includes mapping the TPC command to one of a first slot within a slot cycle of a radio frame and to a second slot within the slot cycle of the radio frame (block S100). The process also includes starting a TPC combining period based on whether the TPC command is mapped to the first slot or the second slot (block S102).

Figure 9:
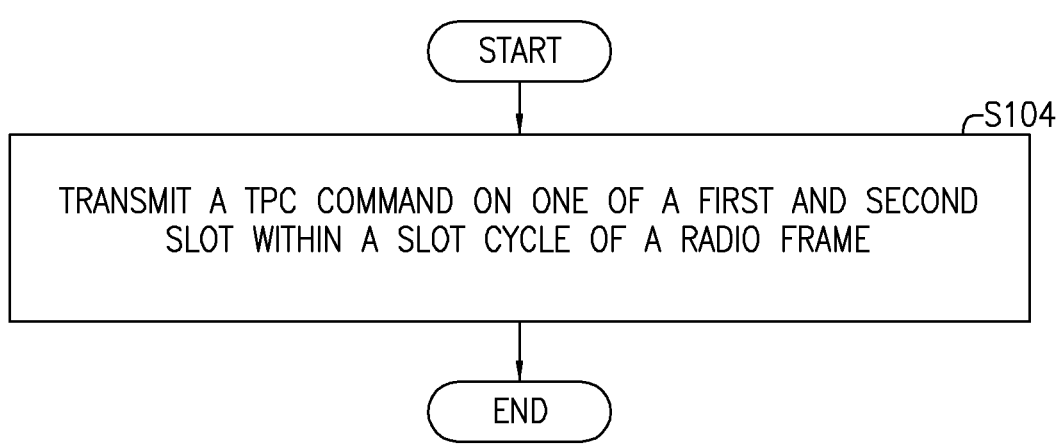
FIG. 9 is a flowchart of an exemplary process in a network node for transmitting TPC commands.
Figure 10:
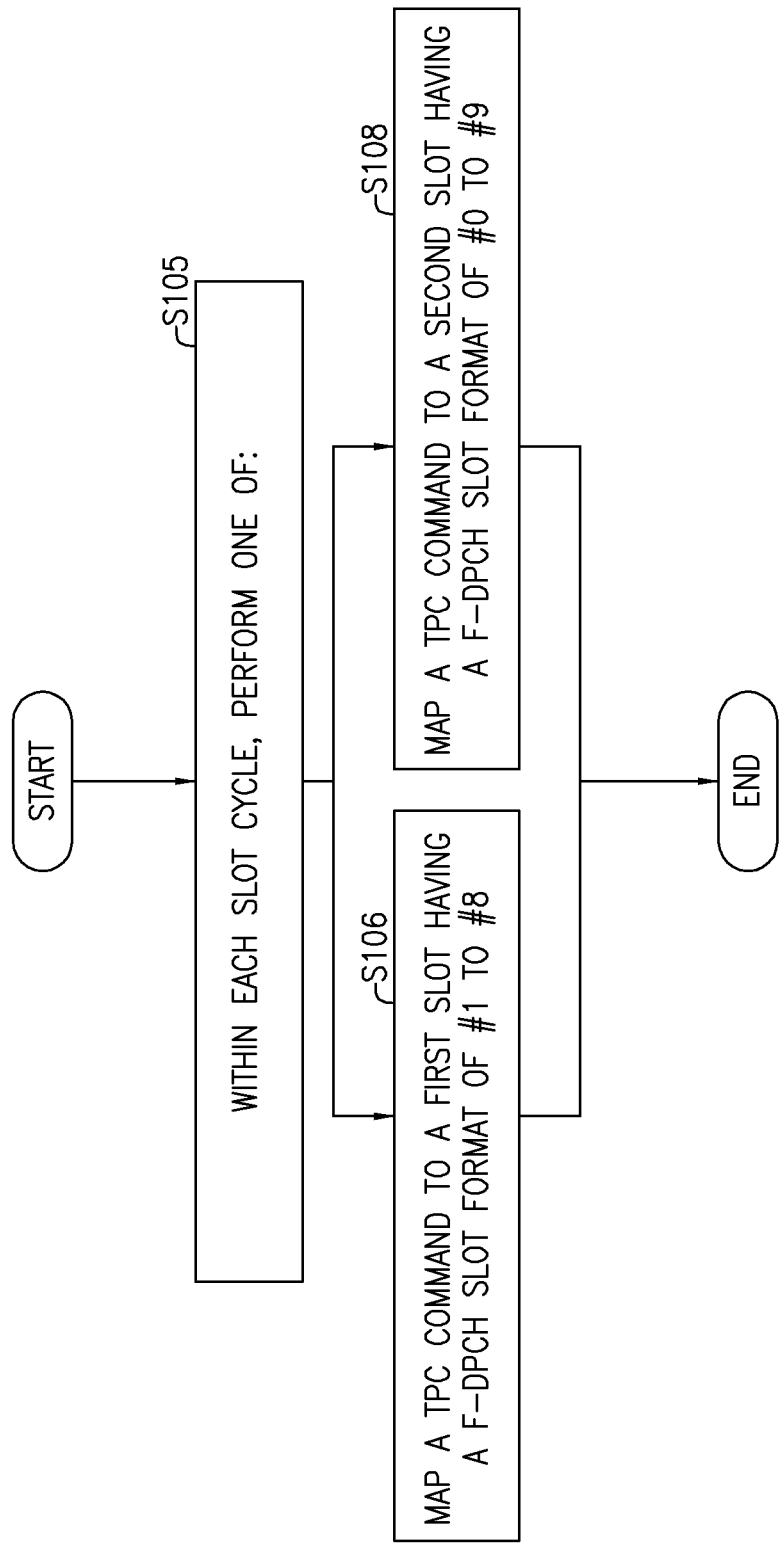
FIG. 10 is a flowchart of a process in a network node for mapping TPC commands.
Figure 11:
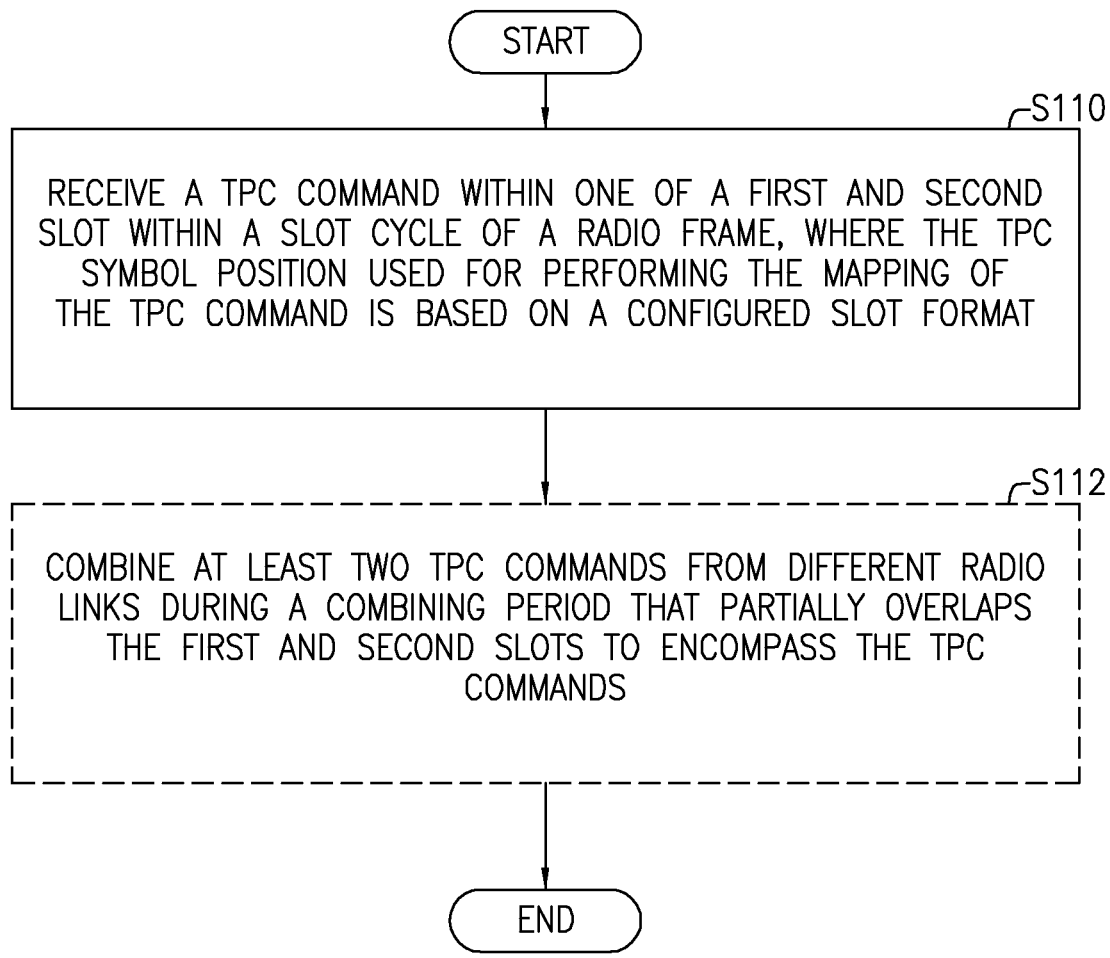
FIG. 11 is a flowchart of an exemplary process in a wireless device of receiving TPC commands.

FIG. 9 is a flowchart of an exemplary process in a network node for transmitting TPC commands. The process includes transmitting a TPC command on one of a first and second slot within a slot cycle of a radio frame (block S104). The TPC commands to be transmitted may have been mapped to a slot in a slot cycle according to FIG. 8 before the transmission. FIG. 10 is a flowchart of a process in a network node for mapping TPC commands. Within each slot cycle, (block S105), the network node performs one of mapping a TPC command to a first slot having a F-DPCH slot format of #1 to #8 (block S106) and mapping a TPC command to a second slot cycle having a F-DPCH slot format of #0 or #9 (block S108). FIG. 11 is a flowchart of an exemplary process in a wireless device of receiving TPC commands. The process includes receiving a TPC command within one of a first and second slot within a slot cycle of a radio frame, where the TPC symbol position used for performing the mapping of the TPC command is based on a configured slot format (block S110). The process further optionally includes combining at least two TPC commands from different radio links during a combining period that partially overlaps the first and second slots to encompass the TPC commands (block S112).

Thus, some embodiments include a method of mapping a transmit power control, TPC, command in a time slot of a radio frame to be transmitted to at least one wireless device on a downlink. The method comprises transmitting a TPC command 18 in one of a first and second slot within a slot cycle of a radio frame, wherein the slot used for transmission of the TPC command is being based on a configured slot format (block S104).

The method may comprise mapping of a TPC command (18) to one of a first and second slot within a slot cycle of a radio frame, wherein a TPC symbol position of the slot used for performing the mapping of the TPC command (18) is based on a configured slot format (block S100). The method may also further comprise starting a TPC combining period based on whether the TPC command is mapped to the first slot or the second slot (block S102).

The method comprises mapping the TPC command to one of a first and second slot within a slot cycle and transmitting the TPC command in one of the first and second slot within a slot cycle to which the TPC command was mapped, a TPC symbol position used being for performing the mapping of the TPC command based on a configured slot format and the slot used for transmission of the TPC command being based on a configured slot format.

In some embodiments, the slot used is a fractional dedicated physical channel (F-DPCH) slot and the configured slot formats are one of slot formats #0, #1, #2, #3, #4, #5, #6, #7, #8 and #9, and wherein the TPC command 18 is transmitted within the second F-DPCH slot if the configured slot format is #0 or #9, and otherwise within the first F-DPCH slot. In other words, the second slot should be used for slot formats 0 and 9, and the first slot should be used for all other slot formats, i.e., slots 1-8. In some embodiments, the method further includes transmitting a TPC command 18 in one of a first and second slot of a slot cycle within the length of a TPC command 18 combining period, where the TPC command combining period has a duration is one slot starting two TPC symbol positions after the downlink slot boundary of a fractional dedicated physical channel F-DPCH.

In some embodiments, each slot cycle is composed of a group of adjacent slots within the set of slots composing a radio frame of the fractional dedicated physical channel, F-DPCH, in a universal mobile telecommunication system, UMTS, wireless network. In some embodiments, a TPC command 18 is transmitted in one slot of a slot cycle that encompasses one of 3 and 5 slots, with 10 TPC symbols per slot, and each TPC command occupying one TPC symbol. A TPC command 18 is transmitted in only of the 3 or 5 slots. In some embodiments, the F-DPCH slot format to be used for mapping a TPC command 18 in the first slot within a slot cycle specifies an offset from a boundary of the first slot by one of 2, 3, 4, 5, 6, 7, 8 and 9 TPC symbols, and the F-DPCH slot format to be used for mapping a TPC command 18 in the second slot within a slot cycle specifies that a TPC command 18 is transmitted adjacent to a start of a boundary of the second slot in any of the first two TPC symbol positions of that slot.

In some embodiments, a first two TPC symbol positions of the second slot within a slot cycle are used for (1) transmission of a TPC command 18 to a wireless device 40, or (2) subsequent TPC symbol positions within the first slot of the slot cycle are specified by the F-DPCH slot format #1 to #8. In some embodiments, when the TPC command 18 is transmitted in the first slot or second slot of a slot cycle, the TPC combining period is started after two TPC symbol positions (512 chips) have passed with respect to the downlink slot boundary of the F-DPCH radio frame. In some embodiments, the method further includes starting the TPC combining period after the first two TPC symbols of the first slot of a F-DPCH radio frame occur and ending the TPC combining period after the first two TPC symbols of a next subsequent slot occur. The TPC combining periods repeat in succession. In some embodiments, a TPC symbol position is used for performing the mapping of the TPC command based on a configured slot format. In some embodiments, a start of the TPC combining period is determined relative to a start of a primary common control physical channel, P-CCPCH.

In some embodiments, the start of the TPC combining period relative to a start of a primary common control physical channel, P-CCPCH, is given by:

$$\text{TPC\_TX\_offset} = (\text{tF-DPCH} + 2560 * k * N + \text{start\_offset} + 256 * NOFF1/2) \bmod 38400$$

for k=0, 1, . . . , 15/N−1, where start_offset=2560 if NOFF1=0, otherwise start_offset=0, tF-DPCH is the fractional dedicated physical channel, F-DPCH, frame timing offset relative to the P-CCPCH, and NOFF1 can be found in an F-DPCH slot format table for a used slot format.

In some embodiments, a method of mapping a transmit power control, TPC, command in a time slot of a radio frame to be transmitted to at least one wireless device on a downlink. The method includes in an initial radio link configuration, within each slot cycle of a plurality of slot cycles, performing (block S105) one of: mapping a TPC command to a first slot of the slot cycle having a F-DPCH slot format (#1 to #8) mapping the TPC command to any of the last eight TPC symbol position (block S106); and mapping a TPC command 18 to a second slot of the slot cycle having a F-DPCH slot format (#0 or #9) mapping the TPC command 18 to any of the first two TPC symbol positions within the second slot (block S108). Note that the slot formats #9 and #0 refer to the first two TPC symbol positions within a slot. Since these two slot formats (#9 and #0) are to be used in the second slot within a cycle, then for the first slot within a cycle there are available all the other slot formats (from #1 to #8) meaning that the TPC command 18 can be mapped to any of the last eight TPC symbol positions. Having this deterministic mapping will automatically solve any issue related with the reception of TPC commands from different radio links in soft handover scenarios. In the initial radio link configuration, within each slot cycle, the wireless device receives one TPC command 18 in the first F-DPCH slot with one of the slot formats from #1 to #8 or in the second F-DPCH slot with one of the slot formats #9 and #0.

Some embodiments include a network node for mapping a transmit power control, TPC, command in a time slot of a radio frame to be transmitted to at least one wireless device on a downlink. The network node 10 includes processing circuitry 12 including a processor 16 and a memory 14 in communication with the processor 16. The memory 14 is configured to store a TPC command 18 and executable program code which, when executed by the processor 16, causes the processor 16 to map the TPC command 18 to one of a first and a second slot within a slot cycle of the radio frame based on a configured slot format. The processor is further configured to transmit the TPC command 18 to at least one wireless device (40) in one of a first and second slot within a slot cycle of the radio frame.

In some embodiments, mapping a TPC command (18) to one of a first and second slot within a slot cycle of a radio frame comprises mapping a TPC command to a TPC symbol position of the used slot, wherein the TPC symbol position of the slot used for performing the mapping and transmitting of the TPC command (18) is based on a configured slot format. In some embodiments, the time slot is a fractional dedicated physical channel (F-DPCH) slot and the configured slot formats are one of slot formats #0, #1, #2, #3, #4, #5, #6, #7, #8 and #9. In some embodiments, the TPC command 18 is transmitted within the second F-DPCH slot if the configured slot format is #0 or #9, and otherwise within the first F-DPCH slot.

In some embodiments, each slot cycle is part of the slots composing a radio frame of a fractional dedicated physical channel, F-DPCH, in a universal mobile telecommunication system, UMTS, wireless network. In some embodiments, a slot cycle encompasses one of 3 and 5 slots, with 10 symbols per slot and each TPC command occupies one TPC symbol. In some embodiments, the F-DPCH slot format to be used for mapping a TPC command 18 in the first slot within a slot cycle specifies an offset from a boundary of the first slot by one of 2, 3, 4, 5, 6, 7, 8 and 9 TPC symbols, and the F-DPCH slot format to be used for mapping a TPC command 18 in the second slot within a slot cycle specifies that a TPC command 18 is transmitted adjacent to a start of a boundary of the second slot in any of the first two TPC symbol positions of that slot.

In some embodiments, the F-DPCH slot format to be used for mapping a TPC command 18 in the first slot within a slot cycle is one of slot formats 1-8 of a group of slot formats ranging from 0 to 9. The F-DPCH slot format to be used for mapping a TPC command 18 in the second slot within a slot cycle is one of slots 0 and 9 of the group of slot formats, the formats of the group being specified by a wireless communication standard. In some embodiments, the network node performs one of the following: a first two TPC symbol positions of the second slot within a slot cycle are used for transmission of a TPC command 18 to a wireless device; and subsequent TPC symbol positions within the first slot of the slot cycle are specified by the F-DPCH slot format #1 to #8.

In some embodiments, the processor of the network node further causing transmission of a TPC command in one of the first and second slot of a slot cycle within the length of a TPC command combining period, where the duration of the TPC combining period is one slot starting two TPC symbol positions after the downlink slot boundary of the F-DPCH. In some embodiments, the processor is further configured to start the TPC combining period after the first two TPC symbols of the first slot of a F-DPCH radio frame occur and end the TPC combining period after the first two TPC symbols of a next subsequent slot occur, the TPC combining periods repeating over the time one after each other. In some embodiments, a start of the TPC combining period is determined relative to a start of a primary common control physical channel, P-CCPCH.

In some embodiments, the start of the TPC combining period relative to a start of a primary common control physical channel, P-CCPCH, is given by:

$$TPC\_TX\_offset=(tF\text{-}DPCH+2560*k*N+start\_offset+ 256*NOFF1/2) \bmod 38400$$

for k=0, 1, . . . , 15/N−1, where start_offset=2560 if NOFF1=0, otherwise start_offset=0, tF-DPCH is the fractional dedicated physical channel, F-DPCH, frame timing offset relative to the P-CCPCH, and NOFF1 can be found in an F-DPCH slot format table for a used slot format.

In some embodiments, a network node 10 is configured to map a transmit power control, TPC, command in a time slot of a radio frame to be transmitted to at least one wireless device on a downlink. The network node 10 includes processing circuitry 12 including a processor 16 and a memory 14 in communication with the processor 16. The memory is configured to store a TPC command 18. The processor 16 is configured in an initial radio link configuration, to, within each slot cycle of a plurality of slot cycles perform one of the following: (a) map a TPC command 18 to one of a first slot of the slot cycle having a F-DPCH slot format (#1 to #8) mapping the TPC command 18 to any of a last eight TPC symbol positions of the first slot (block S106); and (b) mapping a TPC command 18 to one of second slot of the slot cycle having a F-DPCH slot format (#0 or #9) mapping the TPC command 18 to any of the first two TPC symbol positions of the second slot (block S108).

In some embodiments, a method of receiving a transmit power control, TPC, command in a slot of a radio frame in a wireless device is provided. The method includes receiving a TPC command 18 within one of a first and second slot within a slot cycle of the radio frame (block S110). In some embodiments, the TPC symbol position used for performing the mapping and transmitting of the TPC command 18 is based on a configured slot format. In some embodiments, the time slot is a fractional dedicated physical channel (F-DPCH) slot and the configured slot formats are one of slot formats #0, #1, #2, #3, #4, #5, #6, #7, #8 and #9, and the TPC command 18 is received within the second F-DPCH slot if the configured slot format is #0 or #9, and otherwise within the first F-DPCH slot.

In some embodiments, the TPC commands from different radio links are stored in registers accessible by a processor 46. In some embodiments, the method further includes receiving at least two TPC commands from different radio links during a combining period that partially overlaps the first and second slots to encompass the TPC commands. In some embodiments, the method further includes combining at least two TPC commands from different radio links during a combining period that partially overlaps the first and second slots to encompass the TPC commands.

In some embodiments, a wireless device for receiving a transmit power control, TPC, command in a slot of a radio frame is provided. The wireless device 40 includes processing circuitry 42 configured to receive a TPC command 18 within one of a first and second slot within a slot cycle of the radio frame. In some embodiments, the TPC symbol position used for performing the mapping of the TPC command 18 is based on a configured slot format. In some embodiments, the time slot is a fractional dedicated physical channel (F-DPCH) slot and the configured slot formats are one of slot formats #0, #1, #2, #3, #4, #5, #6, #7, #8 and #9, and wherein the TPC command 18 is received within the second F-DPCH slot if the configured slot format is #0 or #9, and otherwise within the first F-DPCH slot.

In some embodiments, the processing circuitry 42 is further configured to receive at least two TPC commands from different radio links during a combining period that partially overlaps the first and second slots to encompass the TPC commands. In some embodiments, the processing circuitry 42 is further configured to combine at least two TPC commands from different radio links during a combining period that partially overlaps the first and second slots to encompass at least two TPC commands. In some embodiments, at least two TPC commands from different radio links are stored in registers accessible by a processor 46.

In some embodiments, a network node 10 for mapping a transmit power control, TPC, command in a time slot of a F-DPCH radio frame to be transmitted to at least one wireless device 40 on a downlink is provided. The network node 10 includes a mapping module 30 configured to map the TPC command 18 to one of a first and a second slot within a slot cycle of the F-DPCH radio frame, where the TPC symbol position used for performing the mapping of the TPC command is based on a configured F-DPCH slot format.

In some embodiments, a network node 10 mapping a transmit power control, TPC, command 18 in a time slot of a F-DPCH radio frame to be transmitted to at least one wireless device 40 on a downlink is provided. The network node 10 includes a memory module 26 configured to store a TPC command 18. The network node 10 also includes a TPC command 18 mapping module 30 configured to map TPC commands to a slot of a slot cycle. The mapping includes one of (a) mapping a TPC command to a first slot of the slot cycle having a F-DPCH slot format (#1 to #8) mapping the TPC command to any of the last eight TPC symbol position (block S106); and (b) mapping a TPC command 18 to a second slot of the slot cycle having a F-DPCH slot format (#0 or #9) mapping the TPC command 18 to any of the first two TPC symbol position within the second slot (block S108).

In some embodiments, each slot cycle is a fractional dedicated physical channel, F-DPCH, in a universal mobile telecommunications system, UMTS, wireless network. In some embodiments, the F-DPCH slot format to be used for mapping a TPC command 18 in the first slot within a slot cycle specifies an offset from a boundary of the first slot by one of 2, 3, 4, 5, 6, 7, 8 and 9 TPC symbols, and the F-DPCH slot format to be used for mapping a TPC command 18 in the second slot within a slot cycle specifies that a TPC command is transmitted adjacent to a start of a boundary of the second slot in any of the first two TPC symbol positions of that slot. In some embodiments, the F-DPCH slot format to be used for mapping a TPC command 18 in the first slot within a slot cycle is one of slot formats 1-8 of a group of slot formats ranging from 0 to 9, and the F-DPCH slot format to be used for mapping a TPC command in the second slot within a slot cycle is one of slot formats 0 and 9 of the group of slot formats, the formats of the group being specified by a wireless communication standard. In some embodiments, the network node 10 includes a TPC combining period determiner module configured to start a TPC combining period relative to a start of a primary common control physical channel, P-CCPCH.

In some embodiments, a wireless device 40 for receiving a transmit power control, TPC, command 18 in a slot of a radio frame is provided. The wireless device 40 includes a TPC receiver module 51 configured to receive a TPC command 18 within one of a first and second slot within a slot cycle of the radio frame, wherein the TPC symbol position used for performing the mapping of the TPC command 18 is based on a configured slot format. In some embodiments, the radio frame is a fractional dedicated physical channel (F-DPCH).

The disclosure advantageously provides a method and system for mapping a transmit power control, TPC, command in a time slot of a radio frame to be transmitted to at least one wireless device on a downlink. According to one aspect, a method includes mapping the TPC command to one of a first slot within a slot cycle of the radio frame and to a second slot within the slot cycle of the radio frame, and starting a TPC combining period based on whether the TPC command is mapped to the first slot or the second slot.

According to this aspect, in some embodiments, when the mapping of the TPC is to the first slot, then the TPC combining period is started in the downlink slot boundary of the fractional dedicated physical channel, F-DPCH. In some embodiments, when the mapping of the TPC is to the second slot, then the start of the TPC combining period relative to a start of a primary common control physical channel, P-CCPCH, is given by:

TPC_TX_offset=(tF-DPCH+2560*$k$*$N$+start_offset+256*$N$OFF1/2)modulo 38400 for k=0, 1, . . . , 15/N−1, where startoffset=2560 if NOFF1=0, otherwise start offset=0, tF-DPCH is the fractional dedicated physical channel, F-DPCH, frame timing offset relative to the P-CCPC, and NOFF1 can be found in an F-DPCH slot format table for a used slot format.

According to another aspect, an apparatus is provided in a network node for mapping a transmit power control, TPC, command in a time slot of a radio frame to be transmitted to at least one wireless device on a downlink. The apparatus includes processing circuitry including a processor and a memory in communication with the processor. The memory is configured to store a TPC command and executable program code which, when executed by the processor, cause the processor to map the TPC command to one of a first slot within a slot cycle of the radio frame and to a second slot within the slot cycle of the radio frame, and start a TPC combining period based on whether the TPC command is mapped to the first slot or the second slot.

According to yet another aspect, an apparatus in a network node is configured for mapping a transmit power control, TPC, command in a time slot of a radio frame to be transmitted to at least one wireless device on a downlink. The apparatus includes a mapping module configured to map the TPC command to one of a first slot within a slot cycle of the radio frame and to a second slot within the slot cycle of the radio frame. The apparatus also includes a TPC combining period determiner module configured to determining a TPC combining period start time based on whether the TPC command is mapped to the first slot or the second slot.

Some embodiments include the following.

Embodiment 1

A method of mapping a transmit power control, TPC, command in a time slot of a radio frame to be transmitted to at least one wireless device on a downlink, the method comprising:

mapping the TPC command to one of a first slot within a slot cycle of the radio frame and to a second slot within the slot cycle of the radio frame; and starting a TPC combining period based on whether the TPC command is mapped to the first slot or the second slot.

Embodiment 2

The method of Embodiment 1, wherein, when the mapping of the TPC is to the first slot, then the TPC combining period is started in a downlink slot boundary of a fractional dedicated physical channel, F-DPCH.

Embodiment 3

The method of Embodiment 1, wherein, when the mapping of the TPC is to the second slot, then the start of the TPC combining period relative to a start of a primary common control physical channel, P-CCPCH, is given by:

TPC_TX_offset=(tF-DPCH+2560*$k$*$N$+start_offset+256*$N$OFF1/2)modulo 38400 for k=0, 1, . . . , 15/N−1, where startoffset=2560 if NOFF1=0, otherwise start offset=0, tF-DPCH is the fractional dedicated physical channel, F-DPCH, frame timing offset relative to the P-CCPCH, and NOFF1 can be found in an F-DPCH slot format table for a used slot format.

Embodiment 4

An apparatus in a network node for mapping a transmit power control, TPC, command in a time slot of a radio frame to be transmitted to at least one wireless device on a downlink, the apparatus comprising:
processing circuitry including a processor and a memory in communication with the processor:
the memory configured to store:
a TPC command; and
executable program code which, when executed by the processor, causes the processor to:
map the TPC command to one of a first slot within a slot cycle of the radio frame and to a second slot within the slot cycle of the radio frame; and
start a TPC combining period based on whether the TPC command is mapped to the first slot or the second slot.

Embodiment 5

An apparatus in a network node for mapping a transmit power control, TPC, command in a time slot of a radio frame to be transmitted to at least one wireless device on a downlink, the apparatus comprising
a mapping module configured to map the TPC command to one of a first slot within a slot cycle of the radio frame and to a second slot within the slot cycle of the radio frame; and
a TPC combining period determiner module configured to determining a TPC combining period start time based on whether the TPC command is mapped to the first slot or the second slot.

| Abbreviation | Explanation |
| --- | --- |
| DTX | Discontinuous Transmission |
| RL | Radio Link |
| SID | Study Item Description |
| SHO | Soft Handover |
| TPC | Transmit Power Control |
| TSG | Technical Specification Group |
| WID | Work Item Description |
| WG1 | Working Group 1 |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of mapping a transmit power control, TPC, command in a time slot of a radio frame to be transmitted to at least one wireless device on a downlink, the method comprising:

transmitting a TPC command in one of a first and second slot within a slot cycle of the radio frame, the one of the first and second slot used within the slot cycle being based on a configured slot format, the one of the first and second slot used being a fractional dedicated physical channel (F-DPCH) slot and the configured slot formats being one of slot formats #0, #1, #2, #3, #4, #5, #6, #7, #8 and #9, and the TPC command being transmitted within the second F-DPCH slot if the configured slot format is #0 or #9, and otherwise within the first F-DPCH slot.

2. The method of claim 1, further comprising mapping the TPC command to the one of the first and second slot within the slot cycle of the radio frame, wherein a TPC symbol position of the one of the first and second slot used for performing the mapping of the TPC command is based on the configured slot format.

3. The method of claim 2, further comprising starting a TPC combining period receiving TPC commands from different radio links based on whether the TPC command is mapped to the first slot or the second slot within the slot cycle.

4. The method of claim 1, further comprising transmitting the TPC command in the one of the first and second slot of the slot cycle within the length of a TPC command combining period which duration is one slot starting two TPC symbol positions after a downlink slot boundary of the fractional dedicated physical channel (F-DPCH).

5. The method of claim 1, wherein each slot cycle is composed of a group of adjacent slots within the set of slots composing a radio frame of the fractional dedicated physical channel (F-DPCH) in a universal mobile telecommunication system (UMTS) wireless network.

6. The method of claim 1, wherein the TPC command is transmitted in one slot of the slot cycle that encompasses one of 3 and 5 slots, with 10 TPC symbols per slot, and each TPC command occupying one TPC symbol.

7. The method of claim 1, wherein one of the following steps is performed:

a first two TPC symbol positions of the second slot within the slot cycle are used for transmission of the TPC command to a wireless device; and subsequent TPC symbol positions within the first slot of the slot cycle are specified by the F-DPCH slot format #1 to #8.

8. A method of mapping a transmit power control, TPC, command in a time slot of a radio frame to be transmitted to at least one wireless device on a downlink, the method comprising:

in an initial radio link configuration, within each slot cycle of a plurality of slot cycles, performing one of:

mapping a TPC command to a first slot of the slot cycle having a fractional dedicated physical channel (F-DPCH) slot format (#1 to #8) that maps the TPC command to any of the last eight TPC symbol position; and mapping a TPC command to a second slot of the slot cycle having a F-DPCH slot format (#0 or #9) that maps the TPC command to any of the first two TPC symbol positions within the second slot.

9. The method of claim 8, wherein, within each slot cycle, one TPC command is transmitted in one of: (a) the first F-DPCH slot with one of the slot formats from #1 to #8 and (b) in the second F-DPCH slot with one of the slot formats #9 and #0.

10. A network node for mapping a transmit power control, TPC, command in a time slot of a radio frame to be transmitted to at least one wireless device on a downlink, the network node comprising:

processing circuitry including a processor and a memory in communication with the processor:

the memory configured to store:

a TPC command; and executable program code which, when executed by the processor, causes the processor to:

map the TPC command to one of a first and a second slot within a slot cycle of the radio frame based on a configured slot format; and transmit the TPC command to at least one wireless device in the one of the first and second slot within the slot cycle of the radio frame, the one of the first and second slot used being a fractional dedicated physical channel (F-DPCH) slot and the configured slot formats being one of slot formats #0, #1, #2, #3, #4, #5, #6, #7, #8 and #9, and the TPC command being transmitted within the second F-DPCH slot if the configured slot format is #0 or #9, and otherwise within the first F-DPCH slot.

11. The network node of claim 10, wherein mapping the TPC command to the one of the first and second slot within the slot cycle of the radio frame comprises mapping the TPC command to a TPC symbol position of the used one of the first and second slot, wherein the TPC symbol position of the one of the first and second slot used for performing the mapping and transmitting of the TPC command is based on the configured slot format.

12. A network node, the network node mapping a transmit power control, TPC, command in a time slot of a radio frame to be transmitted to at least one wireless device on a downlink, the network node comprising:

processing circuitry including a processor and a memory in communication with the processor:

the memory configured to store:

a TPC command; and the processor configured in an initial radio link configuration, to, within each slot cycle of a plurality of slot cycles, perform one of:

mapping a TPC command to one of a first slot of the slot cycle having a fractional dedicated physical channel (F-DPCH) slot format (#1 to #8) mapping the TPC command to any of a last eight TPC symbol positions of the first slot; and mapping a TPC command to one of second slot of the slot cycle having a F-DPCH slot format (#0 or #9) mapping the TPC command to any of the first two TPC symbol positions of the second slot.

13. A method of receiving a transmit power control, TPC, command in a slot of a radio frame in a wireless device, the method comprising:

receiving a TPC command within one of a first and second slot within a slot cycle of the radio frame, the one of the first and second slot used within the slot cycle being based on a configured slot format, the one of the first and second slot used being a fractional dedicated physical channel (F-DPCH) slot and the configured slot formats being one of slot formats #0, #1, #2, #3, #4, #5, #6, #7, #8 and #9, and the TPC command being received within the second F-DPCH slot if the configured slot format is #0 or #9, and otherwise within the first F-DPCH slot.

14. The method of claim 13, wherein the TPC commands from different radio links are stored in registers accessible by a processor.

15. The method of claim 13, further comprising receiving at least two TPC commands from different radio links during a combining period that partially overlaps the first and second slots to encompass the TPC commands.

16. The method of claim 13, further comprising:
combining at least two TPC commands from different radio links during a combining period that partially overlaps the first and second slots to encompass the TPC commands.

17. A wireless device for receiving a transmit power control, TPC, command in a time slot of a radio frame, the wireless device comprising:
processing circuitry configured to:
receive a TPC command within one of a first and second slot within a slot cycle of the radio frame, the one of the first and second slot used within the slot cycle being based on a configured slot format, the one of the first and second slot used being a fractional dedicated physical channel (F-DPCH) slot and the configured slot formats being one of slot formats #0, #1, #2, #3, #4, #5, #6, #7, #8 and #9, and the TPC command being received within the second F-DPCH slot if the configured slot format is #0 or #9, and otherwise within the first F-DPCH slot.

18. The wireless device of claim 17, wherein a TPC symbol position used for performing a mapping of the TPC command is based on the configured slot format.

19. The wireless device of claim 17, wherein the processing circuitry is further configured to receive at least two TPC commands from different radio links during a combining period that partially overlaps the first and second slots to encompass the TPC commands.

20. The wireless device of claim 17, further comprising combining at least two TPC commands from different radio links during a combining period that partially overlaps the first and second slots to encompass at least two TPC commands.

21. The wireless device of claim 17, wherein at least two TPC commands from different radio links are stored in registers accessible by a processor.

* * * * *